United States Patent [19]

Henrichon, Jr. et al.

[11] 3,930,231

[45] Dec. 30, 1975

[54] METHOD AND SYSTEM FOR OPTICAL CHARACTER RECOGNITION

[75] Inventors: Ernest G. Henrichon, Jr., Wellesley Hills; Harvey J. Bloom, Bellingham, both of Mass.

[73] Assignee: Xicon Data Entry Corporation, Newton Upper Falls, Mass.

[22] Filed: June 10, 1974

[21] Appl. No.: 477,808

[52] U.S. Cl. ............. 340/146.3 MA; 340/146.3 AC
[51] Int. Cl.² ............................................ G06K 9/12
[58] Field of Search ............ 340/146.3 AC, 146.3 J, 340/146.3 MA

[56] References Cited

UNITED STATES PATENTS

| | | | |
|---|---|---|---|
| 3,522,586 | 8/1970 | Kiji et al. | 340/146.3 MA |
| 3,541,511 | 11/1970 | Genchi et al. | 340/146.3 AC |
| 3,613,080 | 10/1971 | Angeloni et al. | 340/146.3 MA |

*Primary Examiner*—Leo H. Boudreau
*Attorney, Agent, or Firm*—Kenway & Jenney

[57] ABSTRACT

A method and system for optical character recognition. A character-to-be-read is optically scanned to provide a multiple cell grid representation of the optical density of the character-to-be-read. Each cell of the grid is representative of the optical density of a correspondingly positioned region of the character-to-be-read. A plurality of multiple bit patch words are generated, each patch word representing a rectangular array of the grid cells, with the cells of each array relating to a set of cells in the grid representation having the same predetermined spatial relationship. For each patch word, the presence or absence of predetermined number of features is detected. A multiple bit current vector signal is generated for the character-to-be-read having a bit representative of the presence or absence of each of the features for each of the patch words. The current vector signal is successively compared with a plurality of mask vector signals, each representing one of a plurality of characters in the system vocabulary. The mask vector signal having the highest correlation with the current vector signal is identified as the character-to-be-read.

16 Claims, 11 Drawing Figures

METHOD AND SYSTEM FOR OPTICAL CHARACTER RECOGNITION

BACKGROUND OF THE INVENTION

This invention relates to digital signal processing systems and, more particularly, to optical character recognition systems.

There are two general classifications of systems known in the art for optical character recognition. The first, or optical, class requires precision controlled optics and sophisticated optical benches to perform a series of character processing operations utilizing lenses and photographic masks. Techniques in this area include the utilization of two dimensional fourier transforms and laser and holographic techniques. Generally, the complexity and associated cost of the equipment required for systems in this optical class place such systems out of range of practicality.

The other general classification is an electrical class, wherein optical signals are converted to electrical signals which are subsequently processed. Generally, such systems in the electrical class include three steps:

1. scanning a character-to-be-read,
2. data extraction from the scanned character-to-be-read, and
3. decision and character identification.

In such systems, there is trade-off between the data extraction and decision steps: the more complex the data extracted, the less complex the required decision logic. Accordingly, the practicality of optical character recognition systems of the electrical class is strongly dependent upon the approach taken to the trade-off between the data extraction and decision logic techniques.

There are three general techniques of data extraction generally known in the art:

1. matrix matching,
2. feature extraction, and
3. curve tracing.

The matrix matching approach requires a repetitively performed optical beam scanning procedure for each character-to-be-read. To perform the data extraction step, each scanned character is effectively positioned on a grid of photo-sensitive elements or cells. For a character-to-be-read, each cell of the grid is assigned an identifying binary signal representative of either black or white, dependent on the amplitude of the reflected beam incident on that element of the grid. A multiple bit character vector signal (having an ordered set of bits corresponding to the set of grid cells) is then stored. In the decision step, the character vector digital signal is correlated with each of a plurality of stored multiple bit mask signals, wherein each of the mask vector signals corresponds to the ordered set of bits resulting from the placement on the grid of an "ideal form" of a valid character, of the system vocabulary. The mask vector signal which provides the highest correlation with the character signal is identified by the decision logic as the character-to-be-read.

This method of character recognition has a number of substantial disadvantages. One disadvantage is the requirement for an extensive digital memory system in order to achieve sufficient resolution for practical optical character recognition systems. In addition, the method is highly susceptible to noise-caused errors in the various bits of the character signal. To partially overcome the noise problem, the matrix-matching systems generally permit a predetermined number of errors in a character signal before identifying a character signal as being "unrecognizable." However, in the case where the allowed number of errors becomes substantial, there is a high resultant error rate in the character recognition due to the similarity of valid characters in the system vocabulary. On the other hand, if the correlation between the character signal and the mask signal is required to be very high, i.e., where the permitted number of errors is low, then small errors in the scanning beam position, or relative position of the character-to-be-read, result in large numbers of individual bit errors results in thus leading to rejection of a large number of character-to-be-read as being unreadable. Thus, the matrix-matching approach utilizes a relatively straight forward data extraction step at the cost of requiring a sophisticated decision step for identifying the characters.

The feature extraction approach also generally requires each character-to-be-read to be scanned by an optical beam and effectively placed on a grid of photosensitive elements in a manner similar to the matrix-matching approach. However, rather than a cell-by-cell correlation with a stored mask vector signal, cells are grouped for a character-to-be-read and certain topological attributes or "features" are detected in the various groups of cells. Such features may include identification of long flat areas, bays, loops, ends of lines, mid-segment joints, and extremal points, in conjunction with grid-related positional or angular information, e.g. left, right, top, horizontal. Currently known systems utilizing the feature extraction method of character recognition are limited by the particular types of features identified. Although such feature extraction systems do provide character recognition with a lesser amount of signal correlation than the cell-by-cell approach associated with the matrix-matching technique, the complexity of the various features defined in the prior art methods require a correspondingly complex hardware implementation in order to make a practical character recognition system. Consequently, a correspondingly large amount of signal processing and associated digital storage capability is typically required for the data extraction step with a relatively straight forward requirement for the decision step.

The curve tracing approach is a specialized type of the feature extraction technique and may involve both analog and digital signal processing. Using this controlled-scan method, an optical beam is swept along the contours of a character-to-be-read. Typical features may include contour extremal positions in $x$–$y$ coordinates measured with respect to a coordinate system located at a reference point in the scanning field. The beam control for the sweeping operation is accomplished using analog control signals derived from the processing of the reflected optical signal. The contour extremal positions (in the form of control signals which guide the beam) are stored and subsequently compared with a set of reference or "mask" signals, each member of this set having a relationship to a one of a plurality of characters in the system vocabulary. The hardware implementation of a system of this type requires a large number of analog signal processing devices and a precision controlled optical beam.

Variations on the matrix-matching and feature extraction approaches are also known in the art. Such variations include gray level coding wherein intermediate gray levels are associated with various ones of the features-to-be-extracted. In addition, certain more sophisticated feature extraction systems use weighting methods for certain points within the grid. The selection of the appropriate weights for various areas and the permitted error threshold are variables which the system designer for such systems must select in order to achieve a working system. Again, as the various features of the grid are defined with increasing complexity (e.g. the weighting of certain areas), the system requires correspondingly more complex signal processing in order to achieve an optical character recognition system which performs at a required level for practical applications.

Approaches taken by the prior art systems utilizing a relatively high complexity feature extraction algorithm include a large amount of computer software processing wherein the features of groups of elements in the grid are processed by a computer in real time to identify complexly defined features. However, such systems are subject to a substantial disadvantage in that the computing system used to analyze these features in the data extraction step, and required programming therefor, requires a high degree of sophistication (and associated expense) although the decision step is relatively easy. Also, the associated data signal processing requires a substantial amount of time (due to software limitations based on the time required to get the image to core and processed). Thus, a typical speed for practical error rates in prior art systems of this type is of the order of 100 characters per second.

A further approach employed in prior art systems utilizes a feature extraction technique wherein many of the operations used in the matrix-matching procedure are eliminated by pre-classification of the feature extraction data signal as, for example, a capital letter, with the result that fewer mask comparison operations must be performed. However, this latter approach provides opportunity for erroneous preclassification.

SUMMARY OF THE INVENTION

Accordingly, an object of the present invention is to provide an optical character recognition system which utilizes an improved feature extraction method.

A further object is to provide an optical character recognition system wherein the various features which are extracted permit high speed character identification and relatively straight-forward hardware implementation.

A system constructed in accordance with the present invention uses an opticala scanning means to initially scan a character-to-be-read, to detect its optical density at predetermined spatial points and effectively place the character on a two dimensional multiple cell grid having m rows and n columns. Each cell on the grid has an associated binary signal representative of the optical density of the correspondingly positioned region (or cell) of the character-to-read. The composite of the associated grid cell signals is denoted as the raw image data signal. The system then converts the raw image data signal to a multiple bit current vector signal utilizing a feature extraction algorithm.

In accordance with the feature extraction algorithm, the character-to-be-read is in effect scanned with a "window" or path having a predetermined pattern. At each window (or patch) position, the presence or absence of certain features is detected. In one embodiment, this is achieved by shifting the raw image data signal past a feature detecting window. This feature detecting window includes appropriate circuitry to process the binary data associated with a group of cells having a predetermined spatial relationship in the grid representation of the character to determine the presence or absence of both a particular black and a particular white feature. For example, a 3 cell × 3 cell patch can be represented as a nine bit patch word and a "three or more black cell" feature and a "three or more white cell" feature may both be identified in the feature detection operation as being present or absent. The binary data associated with other groups of cells of the grid forming an identical pattern (e.g., the same 3 cell × 3 cell patch discussed above) is similarly performed for a predetermined number of other effective placements of that patch over the grid representation of the character-to-be-read.

For each feature detection operation i.e., for each identified group of grid cells, (in the above example, for each nine bit patch word) a resultant data bit pair is stored as a portion of the current vector signal. The first bit of each pair is representative of the presence (e.g. binary 1) or absence (e.g. binary O) of the black feature in the grid cells covered by the current effective patch placement, and the second bit is representative of the presence (e.g., binary one) or absence (e.g., binary zero) of the white feature in the grid cells covered by the effective patch placement. It is noted at this point that both bits may be binary ones, representing that both the black and white features are present in the grid cells covered by the current patch placement. Similarly, either or neither bit may be binary one, representing the absence of the corresponding feature. Thus, each character-to-be-read raw image data signal is reduced to a current vector signal having a predetermined number of bits, each bit representing the presence or absence of one of two distinct features for each of a predetermined number of patch placement.

This current vector signal is then correlated with a succession of mask vector signals, each being representative of a single one of a plurality of characters in the system vocabulary. To perform this correlation, the binary one bits for each mask vector signal are compared with the correspondingly positioned bits of the current vector signal, and number of mismatches of the mask binary one bits is accumulated for each mask vector signal. The mask vector signal having the lowest count of mismatches is denoted as the best match signal (having the highest correlation factor). The patch shape and the feature definition (by which a particular feature is noted as being present or absent) are selected in a manner so that the comparison of the current vector signal with the succession of mask vector signals results in a single mask vector signal having a substantially high correlation factor, while all other mask vector signals result in a low correlation factor. The character associated with the mask vector signal yielding the best match signal is identified as the character-to-be-read.

The particular feature detection algorithm used in the present invention permits a substantial reduction in the number of correlation decisions which are required so that 100% of the feature extraction bits (i.e., two for each of a predetermined number of effective patch placements) may be correlated in a practical system. This compares with systems known in the prior art which may use the matrix matching technique (wherein 100% of the raw data bits, i.e., one bit for each cell, must be correlated) requiring a substantially larger memory and also substantially larger amount of digital processing (for the same system resolution) or feature extraction techniques having substantial preclassification of the character-to-be-read using the raw data.

Further, according to the present invention, an identical window or patch is effectively used repeatedly for the feature extraction procedures at each effective patch placement with the result that hardware implementation is greatly facilitated since the feature detection may be accomplished by the multiplexed use of the same hardware elements. In addition, the relatively small number of points to be correlated permits a substantially lessened requirement for digital memory storage capacity.

In addition to the above cited advantages of the present invention in the reduction in the number of extracted features and ease in extraction the present invention provides a further advantage in that the mask vector signals for the system vocabulary may be readily generated and stored by a digital computer. This method of mask definition permits the identification of sloppily formed characters and skewed characters to be recognized.

To generate a mask vector signal, an ideal reference character is used as a basis for the generation of the corresponding mask vector signal generation. This ideal character is scanned in the same manner as described above for the character-to-be-read in order to produce a vocabulary raw image data signal. The same feature extraction process as described above is applied to that raw image data signal resulting in a first preliminary mask vector signal. This first preliminary signal is stored in a digital memory. The reference character is then shifted to the right by a single cell in the grid pattern and the feature extraction process is repeated to generate a second preliminary mask vector signal which is stored in the memory at a different location. This latter process is repetitively performed for the reference character of being shifted to the left in the grid by one cell, shifted up by one cell, shifted down by one cell, and shifted up by two cells, with the resultant third through sixth preliminary mask vector signals similarly stored at separate locations in the memory system. From these six preliminary mask vector signals, each bit thereof is applied to an input of an AND gate and the resultant sequence of bits is used to form a corresponding bit of the mask vector signal for the reference character. That is, the character mask in the system vocabulary in the intersection of the preliminary mask vector signals for the reference character as positioned in a sequence of offset position in the grid.

This mask vector signal generation procedure is repeated for each character in the system vocabulary. As a result, the character mask vector signal for each vocabulary character will still permit positive identification of a character in the presence of scanning errors or if the character-to-be-read is in that offset position on the text-to-be-read. The advantage of this automatic mask generation procedure is that it is well suited for digital logic operations and may be performed on a digital computer in a substantially inexpensive manner.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
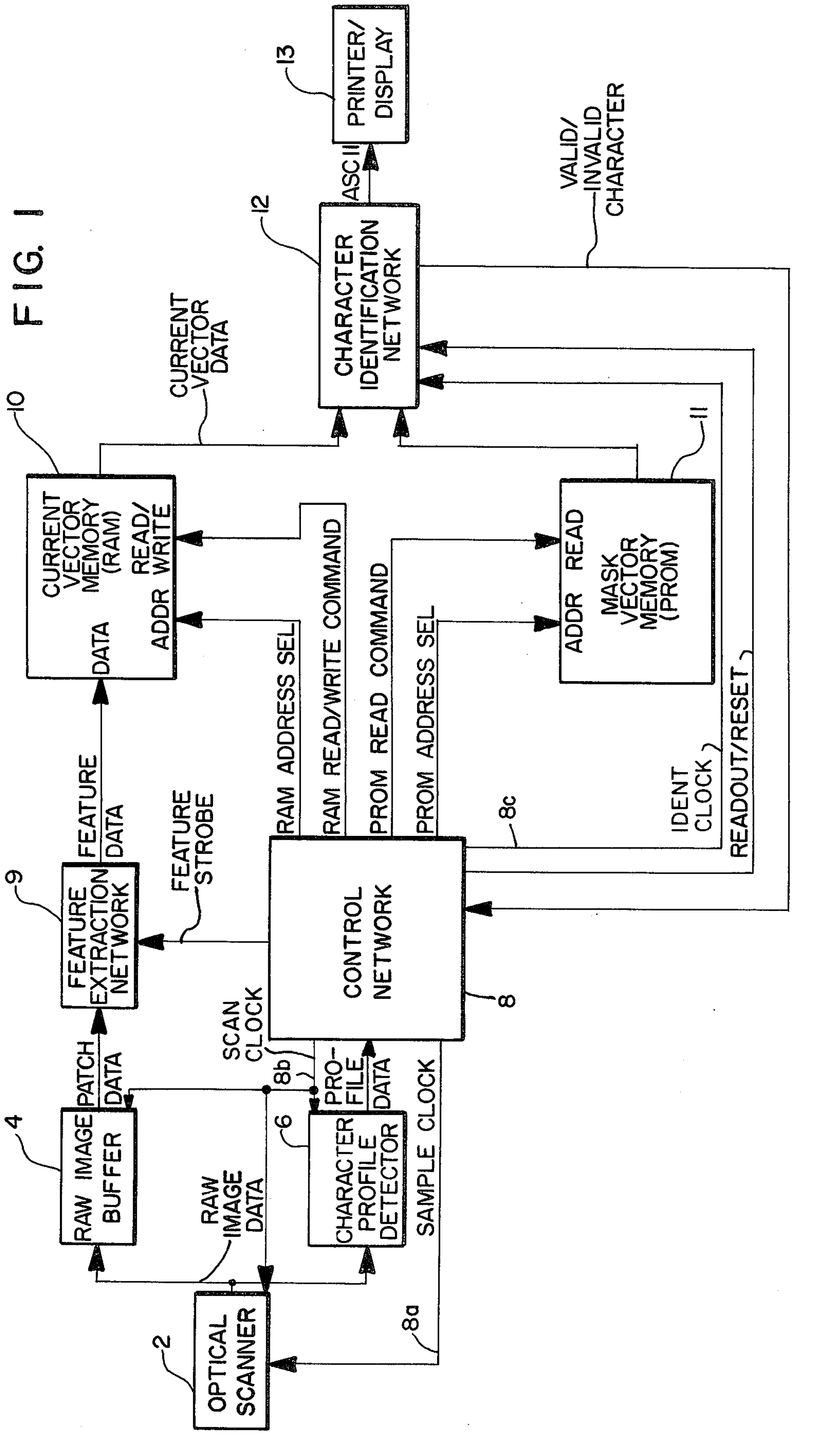
FIG. 1 shows, in block diagram form, an optical character recognition system in accordance with the present invention.

FIG. 1 shows an embodiment of an optical character recognition system in accordance with the present invention. An optical scanner 2 is effective to scan a character-to-be-read along a plurality of substantially parallel lines of scan and to generate an associated raw image data signal. The raw image data signal is a multiple bit signal, with each bit being representative of the optical density of an associated region of the character-to-be-read and each bit being characterized by a binary one when the optical density of a region exceeds a predetermined threshold and a binary zero otherwise. In effect, the raw image data signal forms a multiple cell grid representation of each character-to-be-read, wherein each cell of the grid has a binary value representative of the optical density of a correspondingly positioned region of the character-to-be-read, and wherein the grid is substantially larger than the dimensions of the character-to-be-read.

The raw image data signal is applied to both a raw image buffer 4 and a character profile detector 6.

The raw image buffer 4 provides shift register storage of the raw image data and further provides patch data to the feature extraction network 9. The patch data is in the form of a succession of multiple bit words, one for each of a plurality of predetermined patch positions. Each patch data word is representative of the binary states of a selected group of cells in the grid representation of the character-to-be-read as stored in buffer 4. The cells in each of the selected groups correspond to regions in the character-to-be-read bearing identical spatial relationships.

The character profile detector 6 generates character profile data for application to control network 8. The profile data is representative of the boundaries of the character currently being scanned by scanner 2 and is utilized by control networks to generate the feature strobe signal which effectively repositions the path over the grid representation of the character-to-be-read.

In response to a feature strobe signal applied by control network 8, the feature extraction network 9 generates feature data associated with each patch data word. The feature data is representative of predetermined topological attributes of the patch data applied from buffer 4. In response to command signals generated by network 8, the extracted feature data is applied to and stored in a current vector memory 10 to form a stored current vector data signal.

Following the completion of the feature extraction for a character-to-be-read, control network 8 directs the transfer of the current vector data (as stored in memory 10) and also a succession of stored mask vector data signals from a mask vector memory 11 to a character identification network 12.

The character identification network 12 is effective to compare the current vector data signal, bit by bit, with a succession of mask vector data signals as applied from the mask vector memory 11 to identify as a best match vector, that mask vector data signal which provides the best match with the current vector data signal. Following an evaluation as to whether the best match is "close enough" to current vector data signal identification network 12 indicates to control network 8 whether or not a valid character has been identified and applies a coded signal representative of the identified character on an output line. In the embodiment of FIG. 1, a printer/display 13 prints or displays the character corresponding to the coded signal applied via network 12. In other embodiments, alternative systems to printer/display 13 may be utilized to further process the identified character signal.

Figure 2:
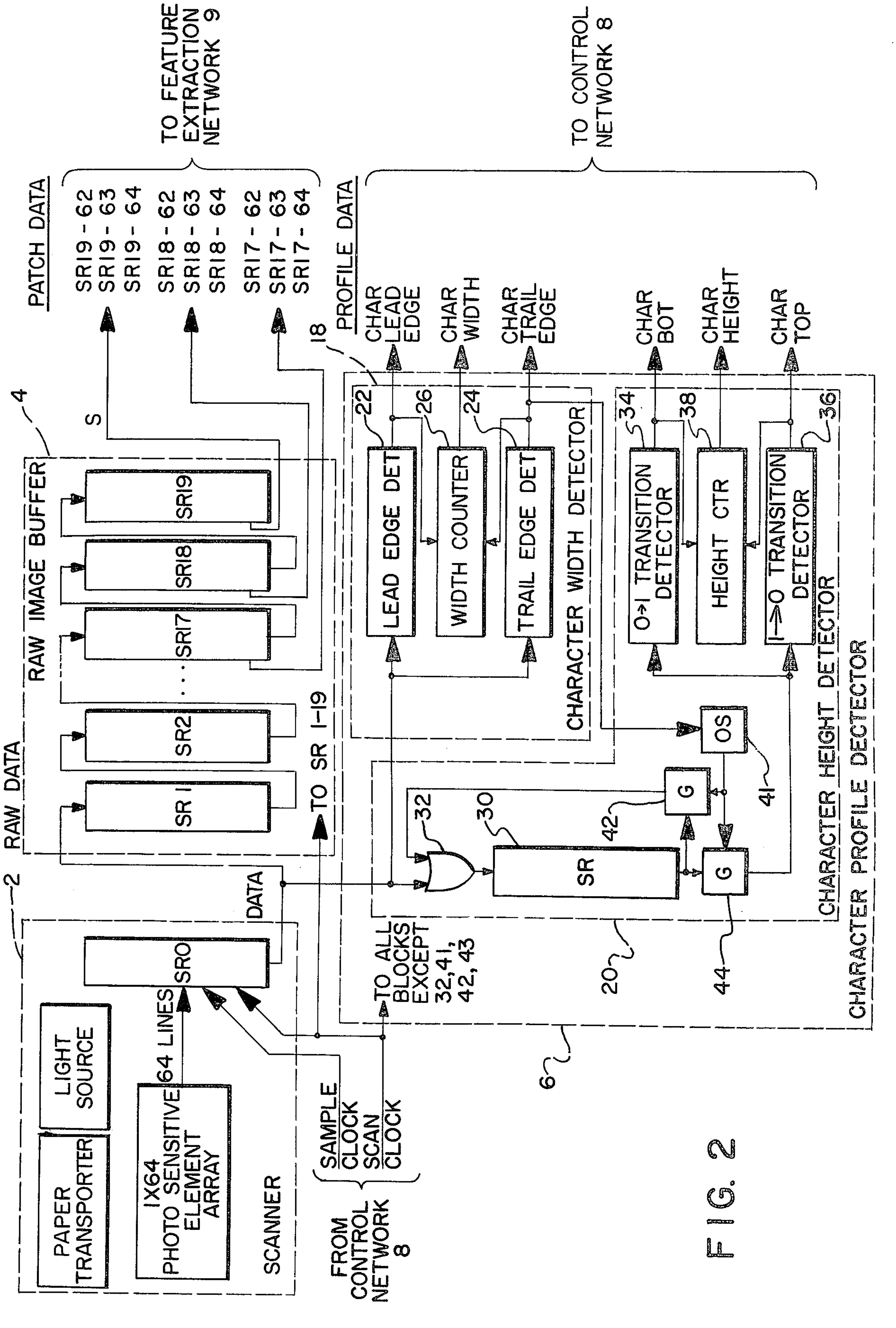
FIG. 2 shows, in block diagram form, an optical scanner raw image buffer and character profile detector for the system for FIG. 1.

The optical scanner 2 may have the form of any scanner known in the art which reduces a two-dimensional optical image to a grid representation having a plurality of rectangular regions, each region being associated with a correspondingly positioned region of the optical image and being characterized by a binary one when the optical density of that associated region exceeds a predetermined threshold, and being characterized with a binary 0 otherwise. By way of example, scanner 2 as shown in FIG. 2 may comprise a paper transporter in accordance with United States Patent Application Ser. No. 477,809 entitled "Paper Transporter", filed on even date herewith, and assigned to the assignee of the present invention. In the present embodiment, this paper transporter may be utilized in conjunction with a 64 bit linear array of photo-sensitive elements, a light source and a 64 bit shift register SRO having each of its stages connected to an associated element of the array.

In operation, the photo-sensitive element array is appropriately positioned so that a sheet of paper bearing printed characters-to-be-read is transported from left to right past the array and further so that the characters in a line of print are successively moved past the array in a direction substantially perpendicular to the linear axis of the array. Each of the elements of the array provide an output signal on an associated one of the 64 parallel input lines connected to register SRO. As each character-to-be-read is transported past the array, successive 64 bit sample data words are loaded in parallel into the shift register SRO in response to applied sample clock pulse provided by the control network 8 via line 8*a*. The bits of each sample data word represent regions of the character-to-be-read along one of a plurality of parallel lines of scan. Between successive sample clock pulses, the contents of the shift register SRO are shifted serially to register SR1 in response to scan clock pulses applied by control network 8 via line 8*b*. In other embodiments, the array may be provided the raw image data by way of a series of integrally related multi-plexing gates.

The present embodiment is configured to recognize characters printed in accordance with the OCR-A font, wherein, each character-to-be-read is within an area approximately 15 cells wide and 18 cells in height as measured in the grid representation. To accommodate effective misplacement of the 15 cell × 18 cell character-to-be-read with respect to the grid, scanner 2.

The raw image buffer 4 is shown in detailed block diagram form in FIG. 2. In that firgure, buffer 4 is shown to include nineteen 64 bit shift registers, denoted SR1 through SR19. These shift registers are connected so that the raw image data applied serially to shift register SR1 may be shifted serially through the successive ones of registers SR1-SR19 in response to scan clock pulses applied from control network 8. The last 3 stages of shift registers SR17-SR19, i.e. bits 62–64 of each of those registers, provide a 9 bit patch data word for feature extraction network 9.

Between successive sample clock signals, the raw image data is shifted 64 bit positions through registers SR1-SR19. As a result of this shift operation, the last 3 stages of registers SR17-SR19 in effect provide a 3 cell × 3 cell patch which is successively repositioned over the grid representation at locations displaced by one cell position for each scan clock pulse.

Figure 3:
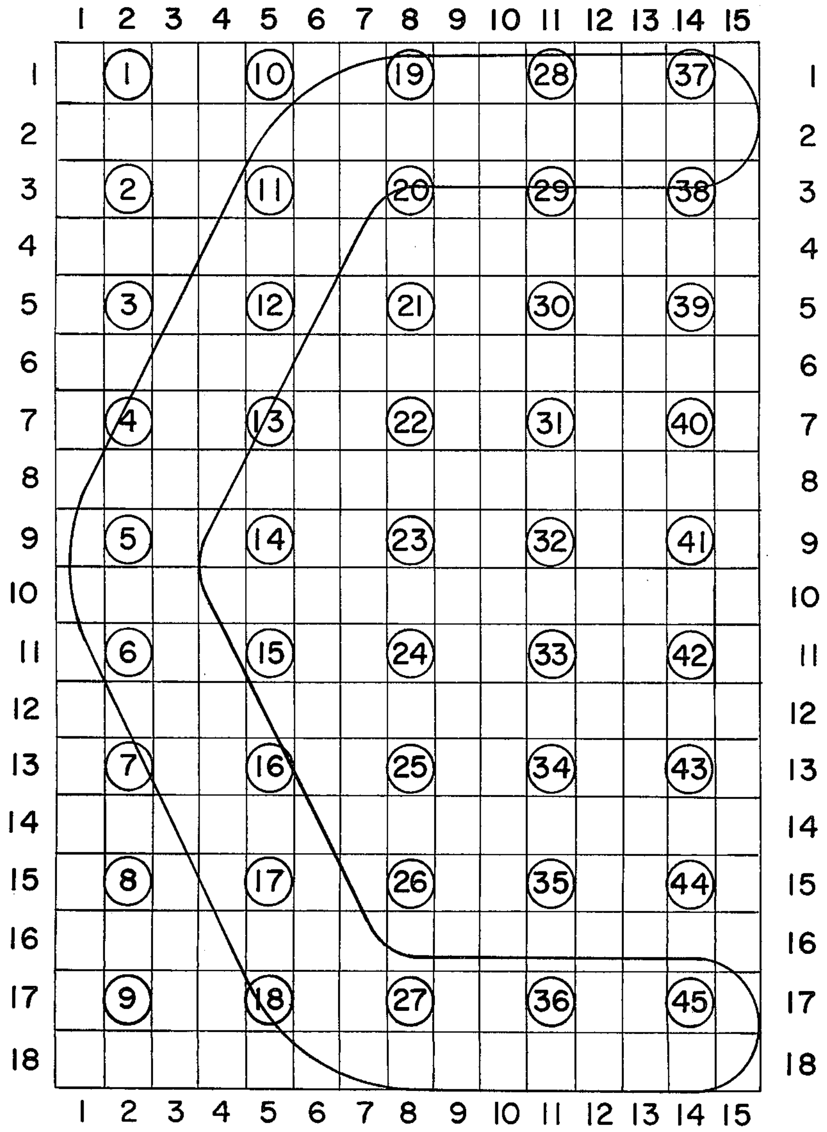
FIG. 3 shows an exemplary character-to-be-read by the system of FIG. 1.

By way of example, FIG. 3 shows an OCR-A character C in a 15 cell by 18 cell grid. Assuming that the character C is scanned from left to right by the optical scanner 2, and assuming further that the data is shifted through registers SR1-SR19 with the top bit in a column being entered first, then at an initial reference time, the 9 bit patch data word from registers SR17-SR19 would be representative of the detected optical density with the patch position being located to cover the first 3 cells of the first three rows of the grid. Following the next scan clock pulse (which shifts the data through registers SR1-SR19), the 9 bit patch data word would be representative of the bits in the grid corresponding to the first 3 bits of the rows 2–4. Similarly, the patch would be effectively shifted vertically down the grid by one row for each subsequent scan clock pulse until the central cell of the 3 × 3 patch covered the cell referenced by the encircled numeral 9. Following the third subsequent scan pulse, the patch is effectively positioned to cover the second through the fourth cells of the first three rows of the grid, i.e. the path data word would correspond to the detected optical density of the cells in columns 2–4 in the first 3 rows of the grid. The patch is effectively shifted vertically down columns 2–4 of the grid following subsequent scan clock pulses. In this manner, the patch is effectively positioned over the entire grid. It will be understood that in the present embodiment, each of the characters to be read may be found within the 15 column by 18 row grid arrangement, although the shift register elements SR1-SR19 provide data representative of a 19 column by 64 row grid. As described more fully below, the character profile detector 6 is effective to identify the boundaries of the character-to-be-read within the 19 by 64 cell grid and provide profile data to the control network so that the patch data may be effectively strobed only at desired times in the feature extraction network 9. More particularly, the control network 8 generates a feature strobe signal to accomplish the feature extraction operation for each character-to-be-read at the forty-five times when the central cell 3 cell × 3 cell patch is positioned at the specific predetermined locations over the grid denoted by the encircled numerals in FIG. 3.

The character profile detector 6 is shown in detailed block diagram form in FIG. 2 to include a character width detector 18 and a character height detector 20.

Width detector 18 includes leading edge detector 22, trailing edge detector 24 and width counter 26. Detectors 22 and 24 have input signals applied from the output of shift register SRO scanner 2 so that the raw image data is applied in serial fashion in response to scan clock from control network 8. Leading edge detector 22 comprises a means for detecting a first black cell (binary 1) following 128 successive white cells (binary 0) in the sequence of applied raw image data. Trailing edge detector 24 is effective to detect the first two successive 64 bit all-white cell swaths following a swatch having black data cells therein.

In operation, in response to a leading edge detection by detector 22, the width counter 26 is activated to count every 64th scan clock pulse (or, in alternative embodiments, each sample clock pulse) until the detector 24 disables counter 26 following a trailing edge detection. As a result, the count state of counter 26 is representative of the number of columns between the leading and trailing edge, i.e. the width of the character-to-be-read, since each column of a valid character (OCR-A) includes at least one black cell. Detectors 22 and 24 respectively generate signals representative of the time at which a character leading and a character trailing edge occurs in the grid representation and counter 26 provides a signal representative of its count state. These latter signals are applied as profile data to the control network 8.

The character height detector 20 includes a 64 bit shift register 30 having the data from its last stage being applied back to its input via a first input of AND gate 42 and a first input of OR gate 32. In addition, the raw image data as applied in serial form from shift register SRO in scanner 2 is also applied to register 30 via a second input of OR gate 32. The last stage of shift register 30 is connected via a first input of AND gate 43 to 0-1 transition detector 34 and to 1-0 transition detector 36. The other inputs to AND gates 42 and 43 are driven by the output of one shot 41 in response to each trailing edge signal generated by detector 24. Detectors 34 and 36 provide output signals representative of the bottom cell of a character within the 64 cells of a column, and the top cell of such a character. These signals are respectively applied to the initiate and inhibit inputs of a height counter 38, which is thereby effective to count successive scan clock pulses between the character bottom and the character top signals.

In operation, gate 42 is normally closed and gate 43 is normally open so that the shift register 30 and OR gate 32 may effectively collapse all of the black cells in a character into a single column. This is accomplished by ORing the raw image data with a data output from register 30, with a resulting series of binary one cells recirculating through shift register 30, with the number of such cells corresponding to the character height. Following each full character, as determined by the character width detector 18, a one shot 41 is effective to open gate 42 and close gate 44, thereby preventing the recirculation of the data from shift register 30 from being applied to OR gate 32 for a time period equal to 64 scan clock periods, and also to permit the serial emptying of shift register 30 by way of gate 44 and applied to detectors 34 and 36. As the data is applied to 0-1 transition detector 34, the first 0-1 transition detected by detector 34 is effective to indicate the bottom of a character to control network 8 and to initiate the height counter 38. The first 1-0 transition in the applied data, which is separated from the most recent 0-1 transition by at least six bits (thereby accommodating two segment characters, e.g. = ), is detected by 1-0 transition detector 36 which in turn generates a signal indicating the character top to control network 8 and also disabling height counter 38. Thus, detectors 34 and 36 respectively generate signals representative of the times at which a character top and bottom occur in the grid representation and height counter 38 provides a signal representative of the character height to control network 8.

Figure 4:
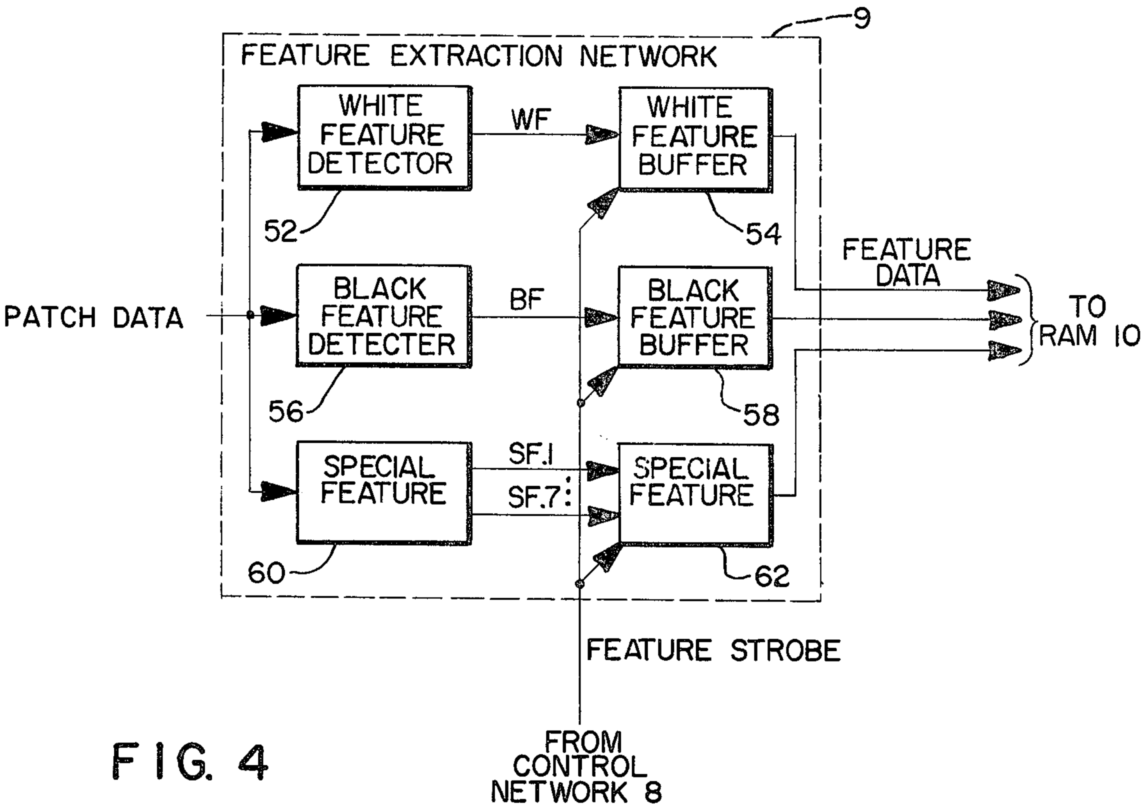
FIG. 4 shows, in block diagram form, a feature extraction network for the system of FIG. 1.

The feature extraction network 9 is shown in FIG. 4 to include white feature detector 52 and buffer 54, black feature detector 56 and buffer 58 and special feature detector 60 and buffer 62. Each of the feature detectors 52, 56 and 60 is connected to the patch data via the 9 lines connected to the bit 62-64 stages of shift registers SR17-SR19. White feature detector 52 is connected via a signal line WF to buffer 54, black feature detector 56 is connected via line BF to buffer 58 and special feature detector 60 is connected by 7 lines denoted SF1-SF7 to buffer 62. Each of buffers 54, 58 and 62 provide output lines to the data input of the random access memory (RAM 10) comprising current vector memory 10. The buffers 54, 58, and 62 are connected to the feature strobe line from control network 8.

Each of the detectors 52, 56, and 60 comprise a combinatorial logic network connected to the 9 input patch data word lines. The logic networks provide outputs on the WF, BF and SF1-SF7 lines respectively when the appropriate combination of inputs are applied thereto. The specific logic networks for the various detectors may be readily implemented in accordance with the feature detection rules set forth below in conjunction with FIGS. 7 and 8.

Following each feature strobe pulse, the control network 8 provides a RAM address select signal to the address input of RAM 10 and a RAM write command to the read/write input of RAM 10 to direct the storage of the feature data from extraction network 9 in RAM 10.

Figure 5A:
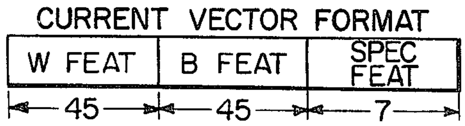
FIGS. 5A–C show the current mask vector and match signal format for the system of FIG. 1.

The current vector signal format for the feature data signal stored in RAM 10 is shown in FIG. 5A. The current vector format includes 45 white feature bits, 45 black feature bits and 7 special feature bits, all as generated by feature extraction network 9.

Following the storage of a complete current vector signal in RAM 10, control network 8 provides an appropriate set of RAM read cammands and RAM address select commands to the read/write and address inputs of RAM 10 in order to read out the current mask vector signal stored therein.

Figure 5B:
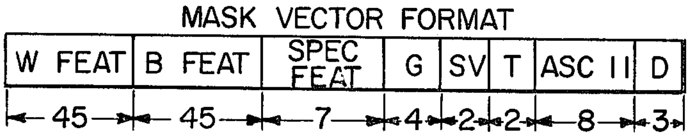

In the present embodiment, the mask vector memory 11 comprises a programmed read only memory (PROM 11) which is programmed to store 93, 116 bit mask vector signals, each representing a character in the system vocabulary. The format for each of the words in the PROM 11 is shown in FIG. 5B to include 45 white (W) feature bits, 45 clack (B) feature bits, 7 special feature bits, 4 group (G) bits, 2 separation value (SV) bits, 2 threshold value (T) bits and 8 ASCII code bits and 3 dummy (D) bits. For each mask vector signal, the 97 feature bits represent feature data for the corresponding characters; the separation value bits represents the relative quality of match between a current vector signal and the mask vector signals required for a valid identification of the corresponding characters, and the 8 ASCII bits represent a standard coded represention of the corresponding character. The group, threshold value, and dummy bits are not used in the present embodiment.

Following the storage of a complete current vector signal in RAM 10, control network 8 provides an appropriate set of PROM read commands to the read input of PROM 11 and PROM address select commands to the address input of PROM 11 in order to successively read out the plurality of mask vector signals stored therein.

Thus, RAM 10 and PROM 11 provide current vector data signals and mask vector data signals on their respective output lines in response to appropriate read command and associated address select signals. Both the RAM and PROM data output lines are applied to the character identification network 12.

Figure 6:
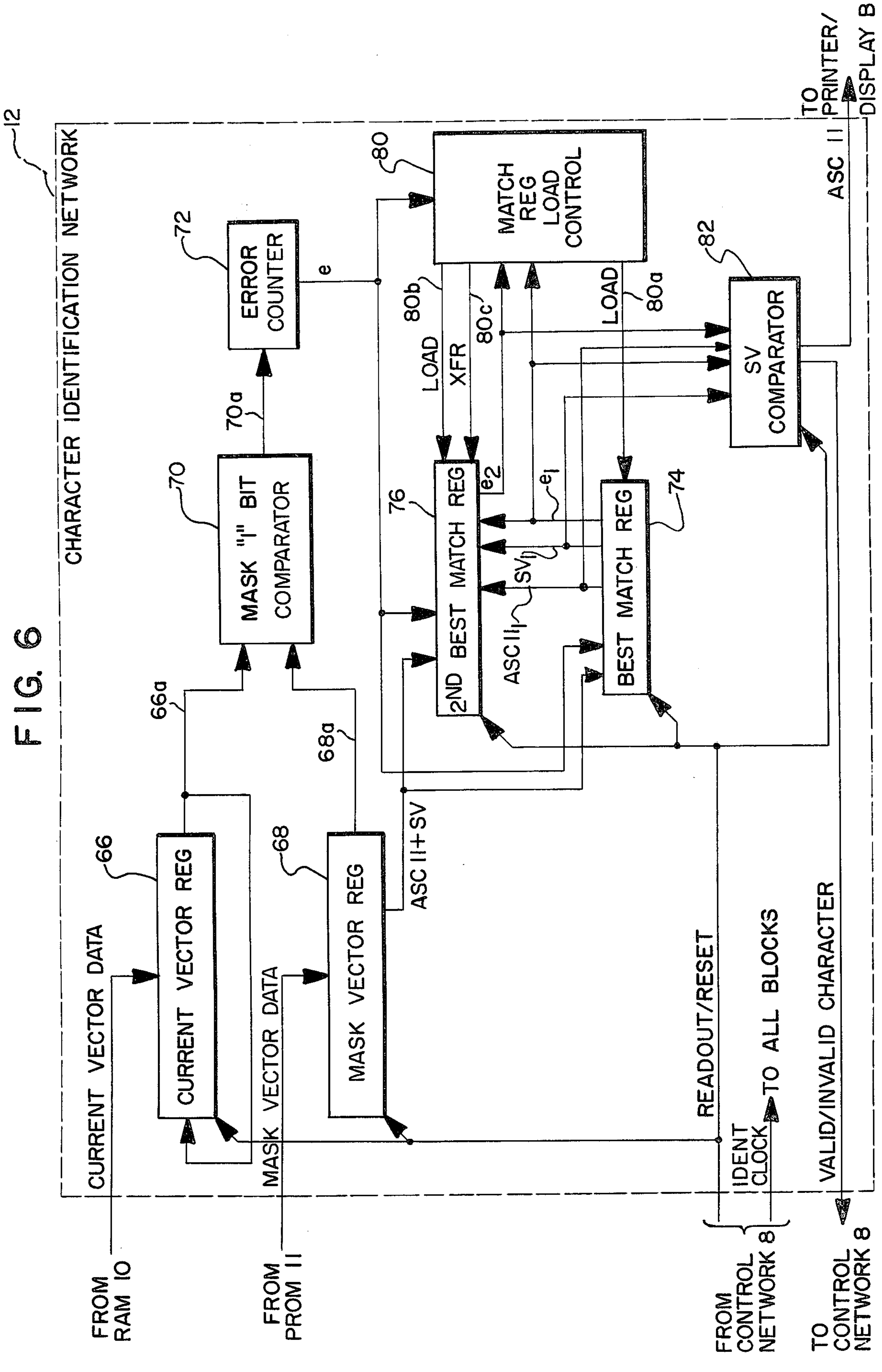
FIG. 6 shows, in block diagram form, a character identification network for the system of FIG. 1.

The character identification 12 is shown in detailed block diagram form in FIG. 6. Network 12 includes a 97 bit current vector shift register 66 and a 116 bit mask vector shift register 68 for storing the applied current and mask vector data signals, respectively. Register 66 is connected to recirculate the data stored therein from its output line 66*a* back to the input of register 66 in response to an identification clock signal applied from network 8 via line 8*c*. Register 68 is connected to serially shift out the data stored therein on its output line 66*a* in response to the identification clock signal. The data output lines 66*a* and 68*a* are applied to a mask vector 1 bit comparator 70 whose output in turn is applied to error counter 72.

In operation, the identification clock signal causes both the 97 bit current vector data signal from register 66 and the first 97 bits of the masked vector data from register 68 to be serially applied to comparator 70. That comparator produces an error signal on line 70a for each binary 1 signal of the mask vector signal on line 68*a* which is not matched by a simultaneously applied binary 1 signal of the current vector signal on line 66*a*. No error signal is generated by comparator 70 otherwise.

For each character-to-be-read, the current vector data is recirculated in register 66 (and applied to comparator 70) continuously. By way of appropriate PROM command signals, the control network 8 directs that a different one of the mask vector data signals stored in PROM 11 is applied to register 68 and comparator 70 for each recirculation of the current vector data in register 66. Accordingly, the comparator 70 detects differences between the current vector data signal and each of the successively compared mask vector data signals, and generates an error signal when a signal is not matched by a correspondingly positioned binary 1 in the current vector data signal. These error signals are counted by counter 72 for each comparison with a mask vector signal.

Figure 5C:
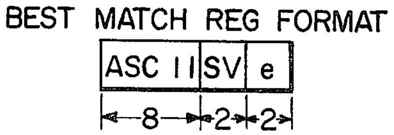

The character identification network 12 also includes a pair of 12-bit shift registers: "best match" register 74 and "second-best match" register 76. FIG. 5*c* shows the format for data stored in registers 74 and 76, where ASCII denotes eight character bits, SV denotes two separation value bits, and e denotes error count state. Both registers 74 and 76 are connected so that the eight ASCII stages are connected in parallel to the stages of mask vector register 68, containing the ASCII bits, following the 97th bit comparision by comparator 70 (i.e. stages 106–113, assuming that stage 1 is the input and stage 116 is the output). In addition, the SV stages of registers 74 and 76 are connected in parallel to the appropriate stages of register 68 (i.e. stages 102–103) so that the separation value bits of the mask vector signal in register 68 are similarly applied to registers 74 and 76 following the 97th comparison by comparator 70. The remaining two stages of both registers 74 and 76 are connected to the two bit count state output line, denoted e, error counter 72. The data load inputs to registers 74 and 76 are connected to a match register load control 80 via load lines 80*a* and *b*. Load control 80 may apply an appropriate signal on either of these load lines which is effective to load the ASCII plus SV bits from register 68 and the e bits from counter 72 to the corresponding one of registers 74 and 76.

The error count state line e and the error stages of registers 74 and 76 (denoted $e_1$ and $e_2$) are connected to load control 80. In addition, the data outputs of the register 74 (denotes ASCII, SV, and *e*), are connected to gated data inputs of the corresponding stages of register 76. The data stored in register 76 may be transferred by these lines to register 76 in response to a transfer signal applied from load control 80 via the line 80*c*.

Thus, the best match register 74 is also connected with the second best match register 76 so that the load control 80 may apply a transfer pulse to shift data stored in the best match register 74 to the second best match register 76 prior to loading the best match register with data from register 68 and error counter 72.

Data lines from the error stages of both registers 74 and 76 ($e_1$ and $e_2$), together with the separation value and ASCII stages of register 74 ($SV_1$ and $ASCII_1$) are all applied to a separation value (SV) comparator 82. A first output of comparator 82 is applied via the valid/invalid character line to control network 8. A second output of comparator 82 is applied via the ASCII line to the printer/display 13.

In addition, the readout/reset line from control network 8 is applied to the best match register 74, separation value comparator 82, and also to the current and mask vector registers 66 and 68.

In operation, for each character-to-be-read, each mask vector signal is correlated in sequence with the current vector signal. The sequence of correlations is performed by matching on a bit-by-bit basis the binary 1's of each mask vector signal with the correspondingly positioned bits in the current vector signal, with the number of mismatches, or errors, providing a measure of each correlation. An error signal and the associated ASCII bits and separation value bits for the mask vector signals yielding the two highest correlations are temporarily stored until the completion of the succession of correlation operations. At that time, difference between the error signals associated with the highest correlation (or best match) and second highest correlation (or second best match) mask vector signal is compared with the separation value associated with the highest correlation (or best match) mask vector signal. If this error difference signal exceeds the best match separation value, character identification network 12 applies the ASCII bits associated with the best match mask vector signal to the printer/display 13 and also applies a valid character signal to the control network 8. Otherwise, network 12 applies an invalid character signal to control network 8.

Referring now to FIG. 6, following the completion of the 97 comparisons by comparator 70 and the accumulation of a related error count in counter 72, counter 72 provides an error count state signal (line $e$) indicative of the number of error signals generated in the comparison operation for a mask vector signal. If that signal indicates the detection of less than three errors, load control 80 compares the current error count signal (line $e$) with the error signal stored in second best match register 76 (line $e_2$). If the error count from counter 72 is greater than the value stored in register 76, then no changes are made in the contents of register 74 and 76 for the associated mask vector signal. If the error count from counter 72 ($e$) is less than the error count stored in register 76 ($e_2$) but greater than the error count stored in register 74 ($e_1$), then load control 80 directs that the ASCII code and separation value (SV) bits from the register 68 and the error count signal $e$ replace the corresponding signals stored in register 76. If the error from counter 72 is less than the error in both registers 74 and 76, then control 80 directs that the contents of register 74 be transferred to replace the contents of register 76 and then the ASCII and separation value bits from register 68 and the error count bits from counter 72 be stored in the register 74.

Following the completion of the successive loading of all mask vector data signals from PROM 11 into register 68 and the associated comparison operations, control network 8 generates a readout/reset signal and applies that signal to network 12. In response thereto, comparator 82 generates a signal representative of the difference between the error signals, $e_1$ and $e_2$ stored in registers 74 and 76, and then compares this difference with the separation value ($SV_1$ as stored in the best match register 74). If the difference in error signals is less than the separation value, then an invalid character signal is transferred to control network 8. If the difference in the error signals is greater than the separation value, then a valid character signal is transferred to network 8 and the ASCII characters from register 74 are transferred out via the ASCII line to printer/display 13. The readout/reset signal is then effective to reset the registers 74, 76 and 66 to contain zeros following the comparator 82 operation. At this point, a character recognition is complete and operation continues for the next character-to-be-read in the subject matter being scanned.

Figure 7:
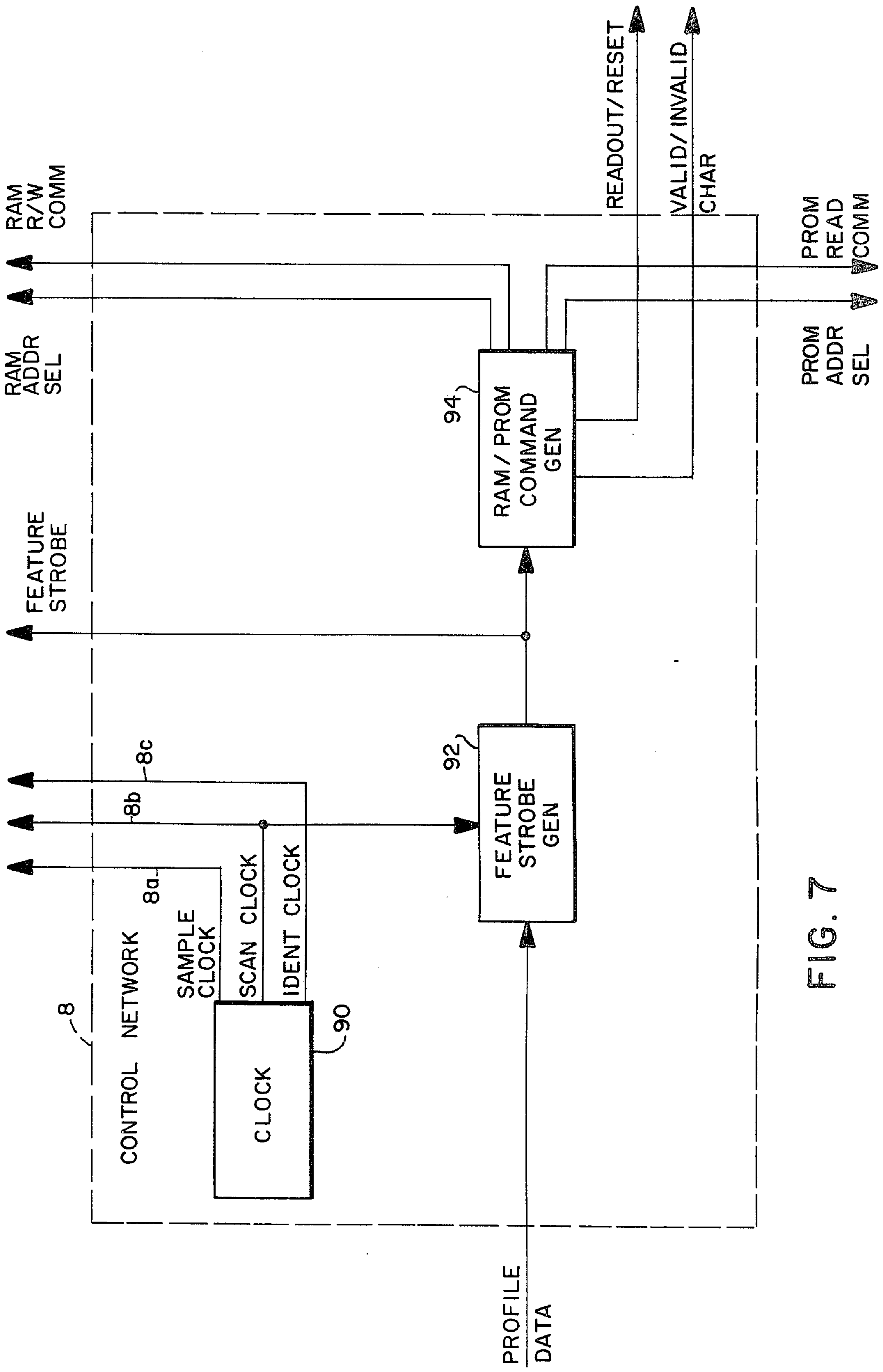
FIG. 7 shows, in block diagram form, a control network for the system of FIG. 1.

The control means 8 for this embodiment is shown in block diagram form in FIG. 7 to include clock generator 92, feature strobe generator 92 and RAM/PROM command generator 94. Clock generator 90 generates a sample clock pulse signal having a repetition rate related to the speed at which the subject matter to be scanned is translated past the photo-sensitive array of scanner 2 and to the desired system resolution. Generator 90 also generates the scan clock signal at a repetition rate 64 times that of the sample signal so that an entire scan line of raw image data may be serially shifted from one of registers SR1-SR19 to the next during the interval between successive sample clock pulses. The identification clock signal produced by generator 90 comprises a 97 pulse burst following the 45th feature strobe pulse and provides the shift signal for directing the application of the current and mask vector signals from registers 66 and 68 to comparator 70 for the present embodiment wherein a currently scanned character-to-be-read is fully processed before the next character-to-be-read is scanned. In alternative configurations wherein a currently scanned character-to-be-read may be examined for feature data while simultaneously, a previously scanned and examined character-to-be-read may be processed for identification purposes, two RAMS may be used with an appropriate buffer and selection means so that during a first cycle, a first RAM may be loaded in conjunction with the scanning of a current character-to-be-read, while data stored in the other RAM in conjunction with the scanning of the previously scanned character-to-be-read is being processed by the character identification network. During the next cycle, the RAM's switch functions.

As noted above, the effective grid representation of the scanned character-to-be-read is a 15 column by 18 row grid portion of the 19 column by 64 row grid provided by the 64 bit scanner array and the shift registers SR1-SR19. Utilizing the character profile data (described in conjunction with FIG. 2), to provide a time reference identifying when the first cell of the grid representation stored in the 63rd stage of SR19, the feature strobe generator 92 generates an appropriately timed sequence of feature strobe pulses sample the output of feature detectors 52, 56 and 60 and to temporarily store that sampled output in the associated feature buffers 54, 58 and 62.

In the present embodiment, the feature strobe pulses are generated at such times as when the central cell of the three by three patch is in effect positioned over the cells in the grid of FIG. 3 having circled numerals associated therewith.

As noted above, raw image buffer 4 provides patch data lines from the last three stages of each of shift registers SR17-SR19. In effect, this patch data arrangement coupled with the specified serial interconnection of shift registers SR1-SR19 provides for a shifting of a three cell by three cell patch over the grid representation of a character-to-be-recognized. As noted above, the patch is effectively shifted by one row per scan clock pulse. In other embodiments, other shaped patches may be similarly shifted in effect over the grid representation. As shown in FIG. 3, there are 45 patch locations associated with the 15 × 18 grid and accordingly, there are 45 feature strobe pulses generated by control network 8 for each character-to-be-read. It will be understood that for each of the 45 specified patch locations, the feature detectors 52, 56 and 60 are effectively interrogated by a feature strobe pulse and the results stored in the associated buffer registers.

Following each such feature strobe pulse, the RAM/PROM command generator 94 is effective to generate a RAM address select signal and a RAM write command signal for application to the current vector memory 10. In this manner, 45 white features and 45 black features and seven special features are stored in RAM 10 for each character-to-be-read.

In the present embodiment, the portion of the grid representation of the character-to-be-read which is in effect covered by the current position of the three row by three column patch is examined to determine whether or not each of a black or a white feature or one of seven special features is present. The patch row which is closest to the top of the grid representation of the character-to-be-read is defined to be the first patch row (i.e. data stored in the 64th stages of registers SR17-SR19) and similarly, the patch column which is closest to the left side of the grid representation of the character-to-be-read is defined as the first patch column (i.e. the data stored in stages 62–64 of registers SR19). As shown in the accompanying figures, the cells in the top row of the patch, from left to right, correspond to the signals on lines SR19-64. SR18-64 and SR17-64, respectively. Similarly, the cells in the second row of the patch from left to right correspond to the signals on lines SR19-63, SR18-63 and SR17-63, respectively, and for the bottom row, the cells of the patch from left to right correspond to the signals on lines SR19-62, SR18-62 and SR17-62, respectively.

While for ease of understanding, the operation is explained in terms of the effective overlay of the patch on the "grid," it will be understood that the circuitry produces a set of binary data signals representing all of the cell positions of the grid and that signals representing specific rectangular subsets of cells within the grid are generated as multiple bit words (or patch words). These multiple bit words are then examined to determine the presence or absence of the features.

The black and white features are defined in a manner which is independent of patch position, i.e. the identical features are detected at each of the 45 positions in the grid representation of the character-to-be-read. As noted above, the presently-described embodiment provides optical character recognition for characters printed in the OCR-A font. For this font, a black feature is defined as being present for a patch location when the following conditions are met:

1. Two or more adjacent black (binary 1) cells in any patch row, or
2. two or more adjacent black cells (binary 1) in the first patch column.

A white feature is defined as being present for a patch location when the following condition is met:

1. A white (binary 0) cell flanked by two adjacent white cells in any corner of the patch.

If for either of the above defined black and white features, the conditions for "feature present" are not detected, then the corresponding one of the black feature signal (BF) and white feature signal (WF) for the patch location is assigned a value binary zero. If either or both of the features are detected as present, then the appropriate one or ones of the feature signals are assigned the value binary one. It will be understood that in other embodiments, other feature definitions may be used.

In addition to the above white and black feature definitions, the following special rules also govern the definition of the WF and BF functions:

1. When the patch is at the bottom of the grid arrangement (i.e. positions 9, 18, 27, 36 and 45 of FIG. 3), the presence of three adjacent black cells in the bottom row of the patch dictates that WF is zero for that patch location, (regardless of the white cell distribution for the patch),
2. when the patch is at the left edge of the grid (i.e. locations 1-9 of FIG. 3), the presence of two adjacent black cells in the first column dictates that the white function WF is assigned binary zero (regardless of the white cell distribution for the patch), and
3. when the patch is at the top of the grid (i.e. at locations 1, 10, 19, 28 or 37), the white function is only binary one when either of the lower corner cells of the patch are white cells flanked by two white cells.

Figure 8:
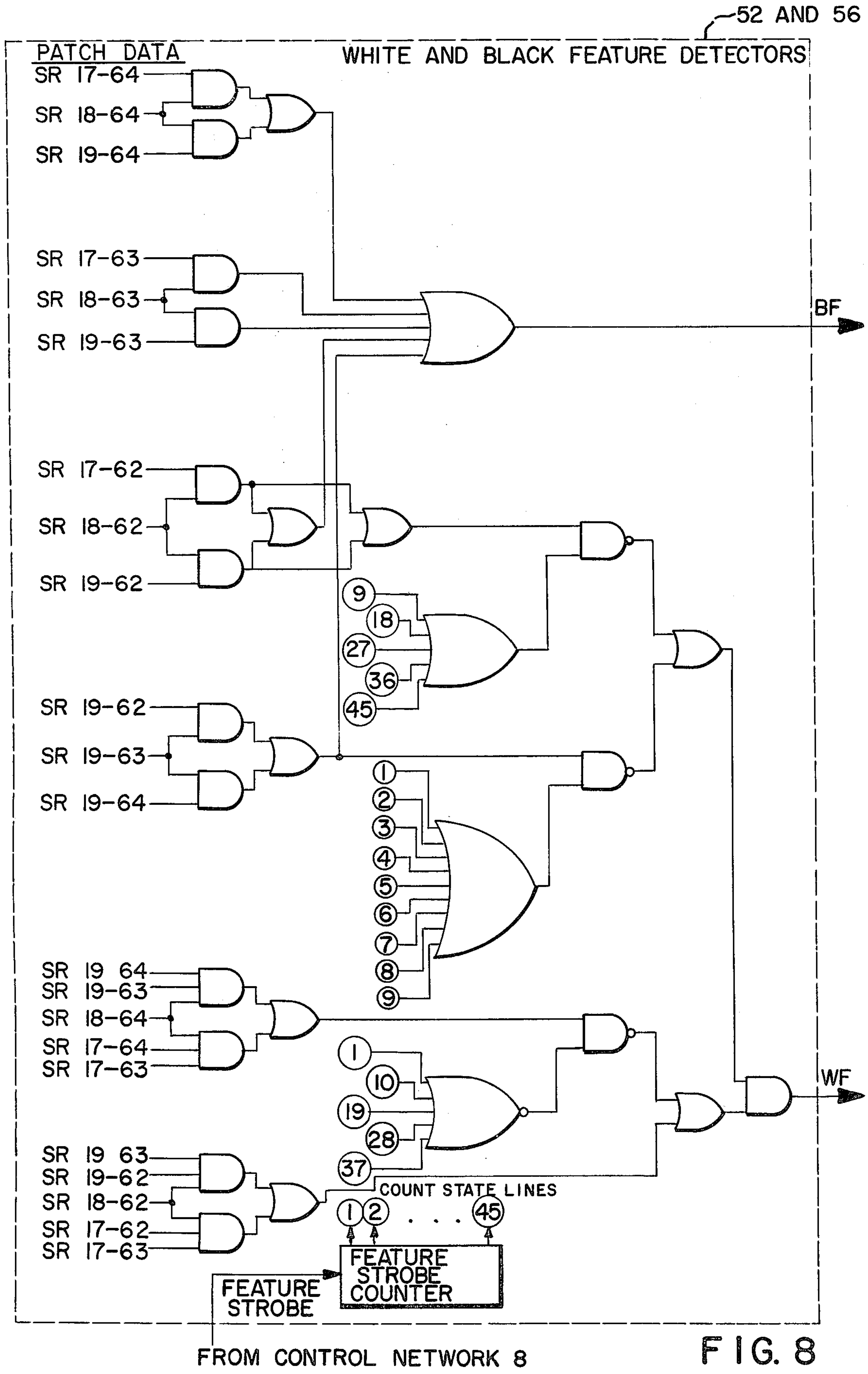
FIG. 8 shows, in block diagram form, black and white feature detectors for the feature extraction network of FIG. 4.

FIG. 8 shows an implementation of the combinatorial logic required for the white and black feature detectors 52 and 56 for the above feature definitions for the OCR-A font. It will be understood that other feature definitions are appropriate for differing fonts.

In order to increase the accuracy through which the present embodiment may recognize characters in the OCR-A font, seven special feature functions, SF1-SF7 are generated by the special feature detector 60. These special feature functions SF1-SF7 provide added data for the following characters, respectively:

P, *p*, *a*, *e*, *n*, *i*, and *l*.

Figure 9:
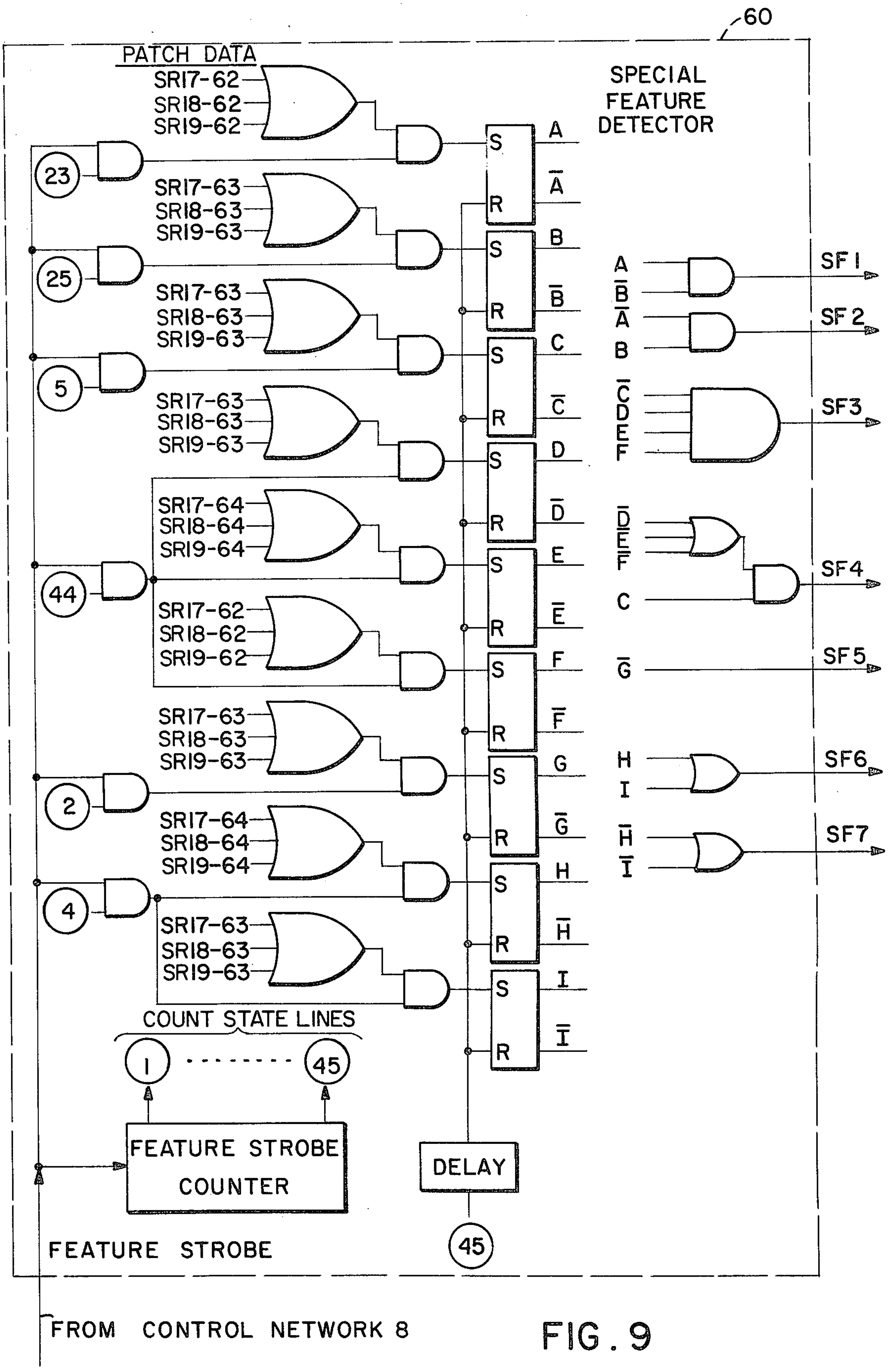
FIG. 9 shows a special feature detector for the feature extraction network for FIG. 4.

A combinatorial logic diagram for an embodiment of the special feature detector 60 for use with the OCR-A font is shown in FIG. 9. It will be understood that detector 60 also requires the patch data input from the last three stages of shift registers SR17-SR19. As the patch is effectively shifted over the grid arrangement, the special feature functions SF1-SF7 are generated in accordance with the logic diagram of FIG. 9.

As noted above, the current vector signal as stored in RAM 10, is compared with each mask vector signals comprising the vocabulary stored in PROM 11. It will be understood that the first 97 bits of each mask vector signal (comprising 45 black feature bits, 45 white features bits and 7 special feature bits), are determined in the following manner. For each character in the vocabulary, a 15 column by 18 row grid arrangement is established over the character corresponding to the mask to be prepared, with the character centered precisely in the 15 by 18 grid (in an idealized position). Then a three cell by three cell patch is in effect positioned over the grid arrangement to each of the 45 positions as shown in FIG. 3. At each position, the portion of the grid covered by the patch is examined for the presence of the white, black and special features in the manner described above. Accordingly, following the 45th such detection operation, a 97 bit "preliminary" mask vector signal is stored.

As the next step in mask generation, the "ideal" character is shifted up one cell relative to the grid and the feature extraction process is repeated producing a second 97 bit preliminary mask vector signal. Following this second feature extraction operation, the character is shifted down one cell from the first position and the process repeated. Similarly, the process is repeated for the character shifted to the left by one cell and then to the right by one cell and finally, shifted up by two cells. Finally, the mask vector signal is generated by determining the intersection of the six preliminary mask vector signals produced by the above feature extraction operations.

This method of mask vector preparation utilizing the intersection of the features permits the recognition of characters using the above-described system wherein the characters may be imperfect in form as compared with the ideal character used in generating the mask.

This mask generation operation may be readily formed for differing fonts by application of a digital computer to generate these mask signals. Also, other combinations of shifting and intersection of the preliminary mask signals may be used in other embodiments.

We claim:

1. Method for optical character recognition comprising the steps of:

A. optically scanning a character-to-be-recognized to identify it as one of a plurality of predetermined vocabulary characters, detecting the optical density of $n$ regions of each scan, said regions being arranged to form a multiple element set of grid cells arranged in a grid of $m$ rows and $n$ columns, and generating a binary signal representative of the optical density of each of said cells, said binary signal being 1 when the optical density of a region exceeds a predetermined threshold and 0 otherwise, so that each cell of said set has the binary value associated with the correspondingly positioned region of said character-to-be-recognized, B. generating a series of multiple bit words, each word representing a rectangular arranged subset of said grid cells, the subset including $p$ rows and $q$ columns, where $p$ is an integer less than $m$ and $q$ is an integer less than $n$, and wherein each word in the series represents a differing subset, C. determining the presence or absence of $r$ features in each word of said series, where $r$ is an integer less than the quantity $2^{mn}$, and each feature is defined as being present in a word when said word includes a predetermined distribution of binary values, said feature being defined as absent otherwise, D. generating and storing a multiple bit current vector signal for said character-to-be-recognized, said current vector signal having a binary 1 for each feature detected as present and a binary 0 for each feature detected as absent in each of said words, wherein each bit position in said current vector signal is associated with one of said words, E. generating and storing a plurality of multiple bit mask vector signals, each representing a different one of said predetermined plurality of vocabulary characters, wherein each bit position in each of said mask vector signals is associated with the same one of said words as the corresponding bit position in said current vector signal, F. comparing said current vector signal with said plurality of stored mask vector signals on a bit-by-bit basis, and G. identifying the mask vector signal which has highest correlation with current vector signal as the character-to-be-recognized.

2. The method of claim 1 where only two features are determined to be present or absent in each of said words.

3. A method in accordance with claim 2 wherein $m$=15, $n$=18, $p$=$q$=3 and the first feature is present in a word of said series if there are at least two adjacent binary 1 cells in any row of said subset, or at least two adjacent binary 1 cells in the first column of said subset, and said first feature is absent otherwise; and wherein further:

the second feature is present in a word of said series if there is a binary 0 cell flanked by two adjacent binary 0 cells in any corner of said subset, and said second feature is absent otherwise.

4. A method in accordance with claim 1 wherein one feature is characterized by a predetermined distribution of binary one values in each of said series of multiple bit words and a second feature is characterized by a predetermined distribution of binary zero values in one of said multiple bit words, not the complement of said first feature.

5. A method in accordance with claim 4 wherein $m$=15, $n$=18, $p$=$q$=3 and the first feature is present in a word of said series if there are at least two adjacent binary 1 cells in any row of said subset, or at least two adjacent binary 1 cells in the first column of said subset, and said first feature is absent otherwise; and wherein further:

the second feature is present in a word of said series if there is a binary 0 cell flanked by two adjacent binary 0 cells in any corner of said subset and said second feature is absent otherwise.

6. A method in accordance with claim 1 wherein said character-to-be-recognized is scanned along a series of $n$ parallel columns of scan, wherein each column extends beyond the limits of said character in a first direction and said series of columns extends beyond said character in a second direction perpendicular to said first direction, and wherein the determination of the presence or absence of said features depends upon one set of determining rules for subsets including only cell locations within the limits of said character and upon a different set of rules for subsets which include cells outside of said limits.

7. A method in accordance with claim 1 wherein the presence or absence of an additional set of $s$ special features is determined for each word of said series and said multiple bit current vector signal has a binary 1 or a binary 0 in each of $s$ predetermined bit locations to indicate the presence or absence of said special features and wherein the correlations of said mask vector signals with a current vector signal includes said predetermined bit locations for only $s$ ones of said plurality of characters-to-be-recognized, $s$ being a small fraction of said plurality.

8. A method in accordance with claim 1 wherein each of said mask vector signals is generated by a process of:

scanning one of a plurality of a predetermined ideal reference characters and generating a series of multiple bit words in accordance with steps A and B of said claim 1, and making a series of determinations of the presence or absence of $r$ features and generating therefrom a series of multiple bit preliminary mask vector signals, each having a binary 1 for each feature detected as present and a binary 0 for each feature detected as absent, the first preliminary mask vector signal of said series being for the set of words in said series which represents a grid of rows and columns centered on and coextensive with said character and the remaining preliminary mask vector signals being for one or more additional sets of words in said series representing a displacement of said grid in the direction either of said rows or said columns by an integral number of cell spaces, and generating the final mask vector signal for each character as a word having binary 1 values only in those bit positions for which a binary 1 value existed in each of the preliminary vector signals.

9. An optical character recognition system comprising:

A. means for optically scanning a character-to-be-recognized to identify it as one of a plurality of predetermined vocabulary characters including:

i. means for detecting the optical density of $n$ regions of each scan, said regions being arranged to form a multiple cell set arranged in a grid of $m$ rows and $n$ columns, and ii. means for generating a binary signal representative of the optical density of each of said cells, said binary signal being 1 when the optical density of a region exceeds a predetermined threshold and 0 otherwise, so that each cell of said set has the binary value associated with the correspondingly positioned region of said character-to-be-recognized, B. means for generating a series of multiple bit words, each word representing a rectangular arranged subset of said grid cells, the subset including $p$ rows and $q$ columns, where $p$ is an integer less than $m$ and $q$ is an integer less than $n$, and wherein each word in the series represents a different subset, C. means for determining the presence or absence of $r$ features in each word of said series, where $r$ is an integer less than the quantity $2^{mn}$, and each feature is defined as being present in a word when said word includes a predetermined distribution of binary values, said feature defined as being absent otherwise, D. means for generating and storing a multiple bit current vector signal for said character-to-be-recognized, said current vector signal having a binary 1 for each feature detected as present and a binary 0 for each feature detected as absent in each of said words, wherein each bit position in said current vector signal is associated with one of said words, E. means for generating and storing a plurality of multiple bit mask vector signals, each representing a different one of said predetermined plurality of vocabulary characters, wherein each bit position in each of said mask vector signals is associated with the same one of said words as the corresponding bit position in said current vector signal, F. means for comparing said current vector signal with said plurality of stored mask vector signals on a bit-by-bit basis and G. means for identifying the mask vector signal which has highest correlation with current vector signal as the character-to-be-recognized.

10. The system of claim 9 where only two features are determined to be present or absent in each of said words.

11. A system in accordance with claim 10 wherein $m$=15, $n$=18, $p$=$q$=3, and the first feature is present in a word of said series if there are at least two adjacent binary 1 cells in any row of said subset, or at least two adjacent binary 1 cells in the first column of said subset, and said first feature is absent otherwise; and wherein further:

the second feature is present in a word of said series if there is a binary 0 cell flanked by two adjacent binary 0 cells in any corner of said subset, and said second feature is absent otherwise.

12. A system in accordance with claim 9 wherein one feature is characterized by a predetermined distribution of binary one values in each of said series of multiple bit words and a second feature is characterized by a predetermined distribution of binary zero values in one of said multiple bit words, not the complement of said first feature.

13. A system in accordance with claim 12 wherein $m$=15, $n$=18, $p$=$q$=3, and the first feature is present in a word of said series if there are at least two adjacent binary 1 cells in any row of said subset, or at least two adjacent binary 1 cells in the first column of said subset, and said first feature is absent otherwise; and wherein further:

the second feature is present in a word of said series if there is a binary 0 cell flanked by two adjacent binary 0 cells in any corner of said subset, and said second feature is absent otherwise.

14. A system in accordance with claim 9 wherein said character-to-be-recognized is scanned along a series of $n$ parallel columns of scan, wherein each column extends beyond the limits of said character in a first direction and said series of columns extends beyond said character in a second direction perpendicular to said first direction, and wherein the determination of the presence or absence of said features depends upon one set of determining rules for subsets including only cell locations within the limits of said character and upon a different set of rules for subsets which include cells outside of said limits.

15. A system in accordance with claim 9 wherein the presence or absence of an additional set of $s$ special features is determined for each word of said series and said multiple bit current vector signal has a binary 1 or a binary 0 in each of $s$ predetermined bit locations to indicate the presence or absence of said special features and wherein the correlations of said mask vector signals with a current vector signal includes said predetermined bit locations for only $s$ ones of said plurality of characters-to-be-recognized, $s$ being a small fraction of said plurality.

16. A system in accordance with claim 9 further comprising a means for generating said mask vector signals, said mask vector signal generating means including:

A. means for optically scanning each of a plurality of predetermined ideal reference character, each ideal reference character corresponding to one of said predetermined vocabulary characters, said ideal character scanning means comprising:

i. means for detecting the optical density of $n$ regions of each scan for each ideal reference character, said regions being arranged to form a multiple cell set arranged in a grid of $m$ rows and $n$ columns, and ii. means for generating a binary signal for each scanned ideal reference character representative of the optical density of each of said cells, said binary signal being 1 when the optical density of a region exceeds a predetermined threshold and 0 otherwise, so that each cell of said set has the binary value associated with the correspondingly positioned region of said scanned ideal reference character, B. means for generating a series of multiple bit words for each scanned ideal reference character, each word representing a rectangular arranged subset of said grid cells, the subset including $p$ rows and $q$ columns, where $p$ is an integer less than $m$ and $q$ is an integer less than $n$, and wherein each word in the series represents a different subset, C. means for making a series of determinations of the presence or absence of $r$ features in each of said words for each of said scanned ideal reference character, D. means for generating a series of multiple bit preliminary mask vector signals associated with said words for each scanned ideal reference character, each preliminary mask vector signal having a binary 1 for each feature detected by said determination means as present and a binary 0 for each feature detected by said determination means as absent, said first preliminary mask vector signal being for the set of words in said series which represents a grid of rows and columns centered on and coextensive with said scanned character and the remaining preliminary mask vector signals being for one or more additional sets of words in said series representing a displacement of said grid in the direction either of said rows or said columns by an integral number of cell spaces, and E. means for generating the final mask vector signal for each scanned ideal reference character as a word having binary 1 values only in those bit positions for which a binary 1 value existed in each of said associated preliminary mask vector signals.

* * * * *